Patented June 7, 1938

2,119,525

UNITED STATES PATENT OFFICE 2,119,525

PRESERVATIVE PROCESS FOR VEGETABLE FIBERS

Wallace T. Conn, Lawrence, Mass., assignor to the Government of the United States, represented by the Secretary of Commerce No Drawing. Application December 12, 1933, Serial No. 702,033

1 Claim. (Cl. 21—4)

(Granted under the act of March 3, 1883, as amended April 30, 1928; 370 O. G. 757)

The invention described herein may be manufactured and used by or for the Government of the United States for governmental purposes without the payment to me of any royalty thereon.

My invention relates to the preservation of vegetable fibers, cordage, thread, or net, for the purpose of prolonging the service life thereof, especially when subjected to varying weather conditions or submerged in water. The invention also relates to the preservation of the products thus treated, and the ingredients for treating such products.

More specifically, my invention relates to combining, in vegetable fibers, chemical and bactericidal preservatives, such as catechu, cutch, quercitron, or other similar tanning materials, with a mechanical armoring or waterproofing cover, and impregnating the fibers with a composition of a tar-like substance.

The tanning or barking of fish nets for the purpose of preservation is perhaps as old as the use of vegetable fibers for nets and today is practiced with various modifications in many parts of the world. It is only within recent times, however, that the efficacy of this principle of preservation has been recognized as a resistance imparted to the fiber which retards digestion of the cellulose by bacteria. Perhaps the most valuable and certainly the most stable protective property of tars on fish nets is the imparted resistance to mechanical abrasion which is comparable to armoring or sheathing. My mechanically efficient cover, even in case of loss of certain chemical constitutents, continues to protect a relatively delicate inclosed material and also will materially retard solution or other changes in the composition of the inclosed material. Heretofore it has been proposed to apply a combination of catechu and tar treatment to fish nets. A suggestion for such an application of catechu and tar may be found in "Bevaring of Garn", Norsk Fisheritideude, vol. V, No. 2, Bergen, April, 1886, which has been translated by Harden F. Taylor in United States Fisheries Document 898.

My invention is an improved method of treating vegetable fibers which are to be subjected to climatic and atmospheric changes, and has distinct advantages over that disclosed in these prior publications and further is such a process as can be utilized for treating such fibers on a large commercial scale.

Broadly speaking, my invention consists in soaking vegetable fibers, cordage, thread or nets in a heated aqueous solution of a tanning agent, boiling the treated fibrous material in an aqueous solution of an oxidizing agent, substantially drying the material, and immersing the dried material in heated tar.

In other words, my invention consists in tanning the fibrous material, applying an after treatment, substantially drying the same, and then applying a cover or armor.

After years of study and experimentation I have successfully accomplished distinct improvements in solving the problems suggested in the publications heretofore discussed, and I have applied my method of preservation to commercial fish nets in which equal benefits have been produced.

The following is one practical form of the process. Number 6 hard laid cable cotton thread has been tanned by soaking in an approximately 6% catechu extract aqueous solution (or 3% quercitron aqueous solution) at a simmering heat of approximately 210° Fahrenheit preferably for approximately twelve hours, then boiling the unwashed thread for approximately 15 minutes in an approximately ½% aqueous solution of potassium dichromate, followed by thorough rinsing in clear water and drying. The dried tanned thread was then immersed in coal tar for approximately 3 minutes at a temperature of approximately 200° Fahrenheit, drained and dried. A coal tar found to give satisfactory results is frequently known as "Fisheries specification coal tar" and consists of tar prepared within the following specification:

Specific gravity at 25° C. (77° F.) _____ 1.10–1.14
Specific viscosity at 40° C. (104° F.) (Engler)
_____ 18–25
Total distillation by weight
   to 170° C. (338° F.) _ Not more than 7 per cent
      270° C. (518° F.) _ Not more than 32 per cent
      300° C. (572° F.) _ Not more than 42 per cent
Bitumen soluble in carbon bisulphide
_____ over 90 per cent
Tar acids_____ Not less than 6 per cent
Water_____ not over 2 per cent By this method vegetable fibers will be found to retain and in fact gain in tensile strength for a long period of use in salt and fresh fishing waters. To my knowledge, the tensile strength is greater after a 6 months' period of constant use in fishing waters of the most destructive nature to vegetable fibers to be found generally in lakes, oceans, bays and rivers. Similar thread treated with the catechu only or the tar only disintegrated under adverse conditions within three weeks.

I believe that the benefit of my combination of chemical and tar treatment is due to upsetting or alteration of the natural food of cellulose digesting bacteria, thus rendering the fiber resistant to bacterial digestion by a chemical change in the composition of the fiber treated, and maintenance of this altered fiber composition over a relatively long period by the tar cover or sheathing.

It will be apparent from the foregoing, that by my invention the armoring and waterproofing effects of the tar conserve the bactericidal effect of the catechu.

It will be understood that the foregoing description of preservation applied to fish nets and twine is not to be limited to any specific method of tanning or cutching vegetable fibers, thread, cordage or nets when covered with a tar-like substance, nor is my invention limited to any specific tar used to impregnate or cover tanned or cutched materials of the class described except as indicated in the claim.

What I claim is:

The art of preserving cordage comprising the soaking thereof in an aqueous solution of approximately 6% of catechu extract at approximately 210° Fahrenheit heat for approximately twelve hours, boiling the material for approximately 15 minutes in an aqueous solution of approximately ½% of potassium dichromate, rinsing in water and drying the material thus treated, and thereafter immersing the dried material for approximately 3 minutes in coal tar at a temperature of approximately 200° Fahrenheit.

WALLACE T. CONN.